Jan. 29, 1957 J. LOXHAM 2,779,585
MECHANICAL GUIDING DEVICES
Filed Jan. 17, 1956
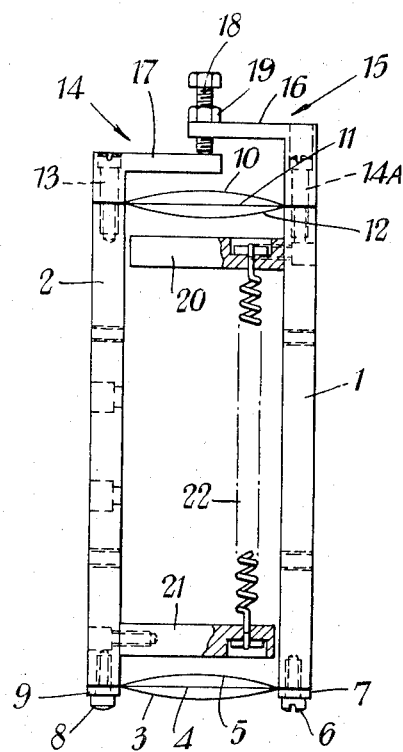

United States Patent Office 2,779,585
Patented Jan. 29, 1957

2,779,585
MECHANICAL GUIDING DEVICES

John Loxham, Letchworth, England, assignor to The Sigma Instrument Company Limited, Letchworth, England, a British company Application January 17, 1956, Serial No. 559,705

Claims priority, application Great Britain January 18, 1955

3 Claims. (Cl. 267—1)

This invention relates to mechanical guiding devices for guiding a movable member to move rectilinearly with respect to a fixed member.

According to the present invention there is provided a mechanical guiding device for guiding a movable member to move rectilinearly with respect to a fixed member, the movable member being supported from the fixed member through the intermediary of two spring strip arrangements, wherein each spring strip arrangement comprises three spring strips one end of each of which is secured to the fixed member and the other end of each of which is secured to the movable member, one of the spring strips being shorter than and between the other two spring strips, which latter consequently assume an arcuate form and maintain said one strip in tension.

For a better understanding of the invention and to show how the same may be carried into effect, reference will now be made to the accompanying drawing, in which the single figure is a partly sectioned side elevation of a mechanical guiding device.

The guiding device has two parallel elongated plates 1 and 2, one (say the plate 1) of which is fixed, the other (the plate 2) being movable. One end of each of three spring strips 3, 4, 5 is secured by a bolt or bolts 6 passed through a block 7, to the lower end of the fixed plate 1. The other end of each spring strip 3, 4, 5 is secured by a bolt or bolts 8 passed through a block 9, to the lower end of the movable plate 2. The spring strip 4 is sandwiched between the strips 3 and 5 and is slightly shorter than the strips 3 and 5. The outer two spring strips 3 and 5 assume an arcuate form concave towards the spring strip 4 and maintain the spring strip 4 in tension.

The upper end of the fixed plate 1 is secured to the upper end of the movable plate by three spring strips 10, 11, 12. One end of each of the strips 10, 11, 12 is secured by a bolt or bolts 13 passed through a bracket 14, to the plate 2 and the other ends of these strips are secured by a bolt or bolts 14A passed through a bracket 15, to the plate 1. The strip 11 is between the strips 10 and 12 and is shorter than these two strips which latter assume an arcuate form concave towards the strip 11 and maintain this strip in tension. The width of each spring strip (i. e. the dimension of the strip that is perpendicular to the plane of the drawing) is perpendicular to the longitudinal axis of the movable plate 2, which axis is the direction in which the movable plate 2 is guided (by the spring strips) to move, the strips flexing during such movement.

The bracket 15 has a lug 16 extending towards the movable plate 2, and the bracket 14 has a lug 17 extending towards the fixed plate 1. The lug 17 is below the lug 16 which latter has a bolt 18 threaded therethrough, the lower end of the bolt 18 forming a stop against which the lug 17 can abut to limit upward movement of the movable plate 2 with respect to the fixed plate 1. A nut 19 is provided on the bolt 18 for locking the latter with respect to the lug 16.

A block 20 located just below the upper set of three springs 10, 11, 12 extends from the fixed plate 1 towards the movable plate 2. A block 21 located just above the lower set of three spring strips 3, 4, 5 extends from the movable plate 2 towards the fixed plate 1. A coiled spring 22 has one end secured to the block 20 and the other end to the block 21, and urges the movable plate 2 upwardly with respect to the fixed plate 1.

The guiding device is advantageously employed in a comparator (not shown) where the movable plate 2 is employed for transmitting motion from a gauging anvil (not shown) supported thereby to another part of the comparator mechanism, the fixed plate 1 being secured to the main body of the comparator.

I claim:

1. A mechanical guiding device comprising a movable member, a fixed member and two spring strip arrangements supporting the movable member from the fixed member, each spring strip arrangement including three spring strips one end of each of which is secured to the fixed member and the other end of each of which is secured to the movable member, one of the spring strips of each arrangement being shorter than and between the other two spring strips of the same arrangement, which latter strips consequently assume an arcuate form and maintain the shorter strip in tension.

2. A device as claimed in claim 1, wherein said other two spring strips of each arrangement each assume an arcuate form that is concave towards said one strip of the same arrangement.

3. A device as claimed in claim 1 and further comprising stop means for limiting the extent to which the movable member can move in one direction with respect to the fixed member, and spring means for urging the movable member in said direction towards the position where further movement thereof is prevented by the stop means.

References Cited in the file of this patent
UNITED STATES PATENTS

| | | |
|---|---|---|
| 820,944 | Adams | May 15, 1906 |
| 2,147,060 | Reynolds | Feb. 14, 1939 |